United States Patent
Biem et al.

(10) Patent No.: US 10,152,677 B2
(45) Date of Patent: *Dec. 11, 2018

(54) SYSTEM AND METHODOLOGY TO HANDLE MISDIRECTED INPUT DATA DURING MULTI PARTITIONED REAL TIME ANALYTICS

(71) Applicant: International Business Machines Corporation, Armonk, NY (US)

(72) Inventors: Alain E. Biem, Yorktown Heights, NY (US); Dattaram Bijavara Aswathanarayana Rao, Bangalore (IN); Bharath K. Devaraju, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 573 days.

This patent is subject to a terminal disclaimer.

(21) Appl. No.: 14/742,910

(22) Filed: Jun. 18, 2015

(65) Prior Publication Data

US 2016/0125315 A1 May 5, 2016

Related U.S. Application Data

(63) Continuation of application No. 14/528,148, filed on Oct. 30, 2014.

(51) Int. Cl.
  *G06F 15/18* (2006.01)
  *G06N 99/00* (2010.01)
  *G06N 5/04* (2006.01)

(52) U.S. Cl.
  CPC .............. *G06N 99/005* (2013.01); *G06N 5/04* (2013.01)

(58) Field of Classification Search
  CPC ...... G06N 99/005; G06N 5/025; G06N 7/005; G06K 9/6256; G06K 9/6269
  (Continued)

(56) References Cited

U.S. PATENT DOCUMENTS 5,045,852 A * 9/1991 Mitchell ............. H03M 7/4006
                                                       341/51
8,073,963 B1   12/2011 Wechsler et al.
(Continued)

FOREIGN PATENT DOCUMENTS

EP    2028857 A1   2/2009
EP    2193478 A1   6/2010

OTHER PUBLICATIONS

Time-series data mining—http://dl.acm.org/citation.cfm?id=2379788.*

(Continued)

*Primary Examiner* — Kakali Chaki
*Assistant Examiner* — Viker A Lamardo
(74) *Attorney, Agent, or Firm* — Stephen R. Tkacs; Stephen J. Walder, Jr.; Kurt P. Goudy

(57) ABSTRACT

A mechanism is provided in a stream computing platform for data stream change detection and model swapping. The mechanism builds a model for each input data stream in a stream computing platform. Each tuple of each given input data stream is tagged with a key corresponding to the given input data stream. The mechanism performs an operation on each input data stream using its corresponding model. The mechanism detects a misdirected input data stream, which is tagged with a key that does not correspond to the misdirected input data stream. The mechanism pauses the misdirected input data stream swaps a model corresponding to the misdirected input data stream with another model corresponding to another paused input data stream.

9 Claims, 6 Drawing Sheets

(58) Field of Classification Search
USPC .......................................................... 706/12
See application file for complete search history.

(56) References Cited

U.S. PATENT DOCUMENTS

| | | | |
|---|---|---|---|
| 9,372,780 B2* | 6/2016 | Barsness | ............. G06F 11/3636 |
| 9,563,539 B2* | 2/2017 | Barsness | ............. G06F 11/3636 |
| 2004/0249776 A1* | 12/2004 | Horvitz | ................ G06Q 10/109 |
| | | | 706/21 |
| 2007/0260568 A1* | 11/2007 | Perng | ..................... G06N 5/025 |
| | | | 706/47 |
| 2012/0130940 A1 | 5/2012 | Gattani et al. | |
| 2012/0137178 A1* | 5/2012 | Barsness | ............... G06F 11/362 |
| | | | 714/35 |
| 2013/0297628 A1 | 11/2013 | George et al. | |
| 2014/0089525 A1 | 3/2014 | Cardon | |
| 2014/0250153 A1* | 9/2014 | Nixon | ............... G06F 17/30312 |
| | | | 707/812 |
| 2014/0281713 A1* | 9/2014 | Hampapur | ............ G06F 11/079 |
| | | | 714/26 |
| 2015/0007143 A1* | 1/2015 | Barsness | ............. G06F 11/3636 |
| | | | 717/129 |

OTHER PUBLICATIONS

"List of IBM Patents or Patent Applications Treated as Related", 2 pages.
"MOA—Massive Online Analysis", http://sourceforge.net/projects/moa-datastream/?source=dlp, retrieved from the internet on Sep. 11, 2014, 3 pages.

* cited by examiner

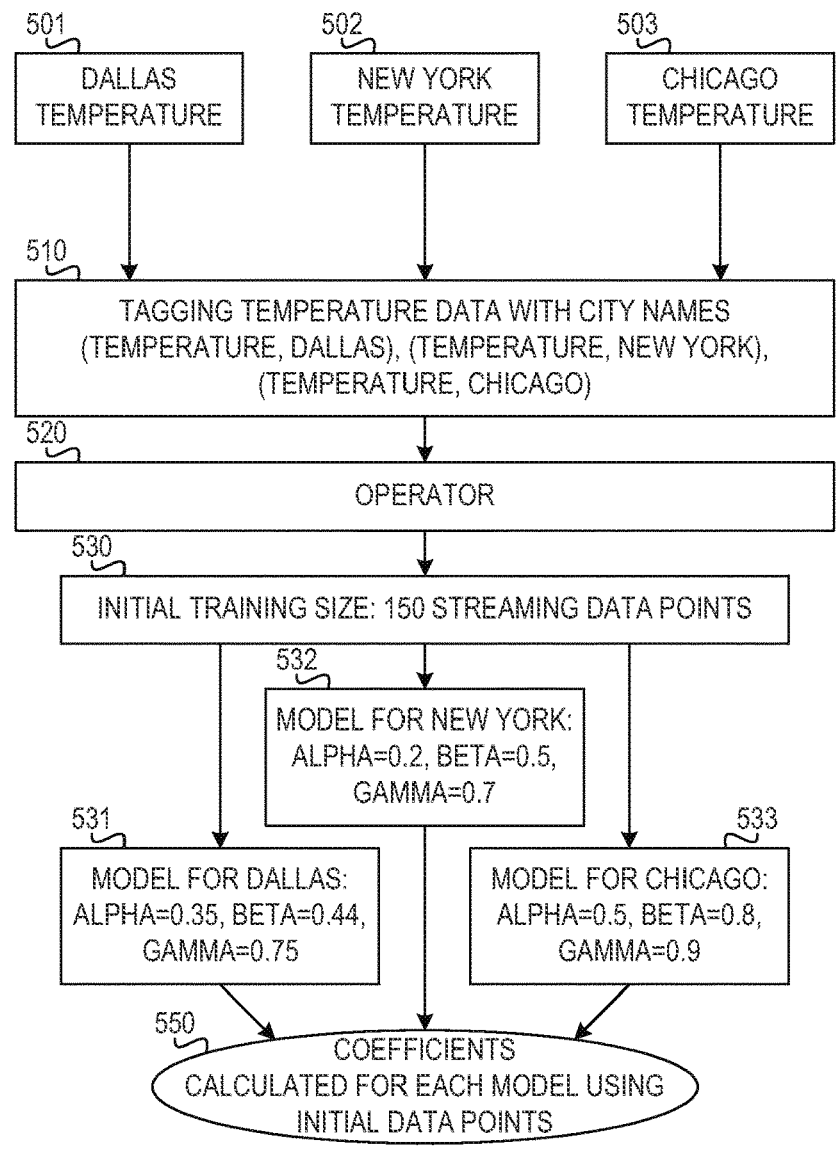

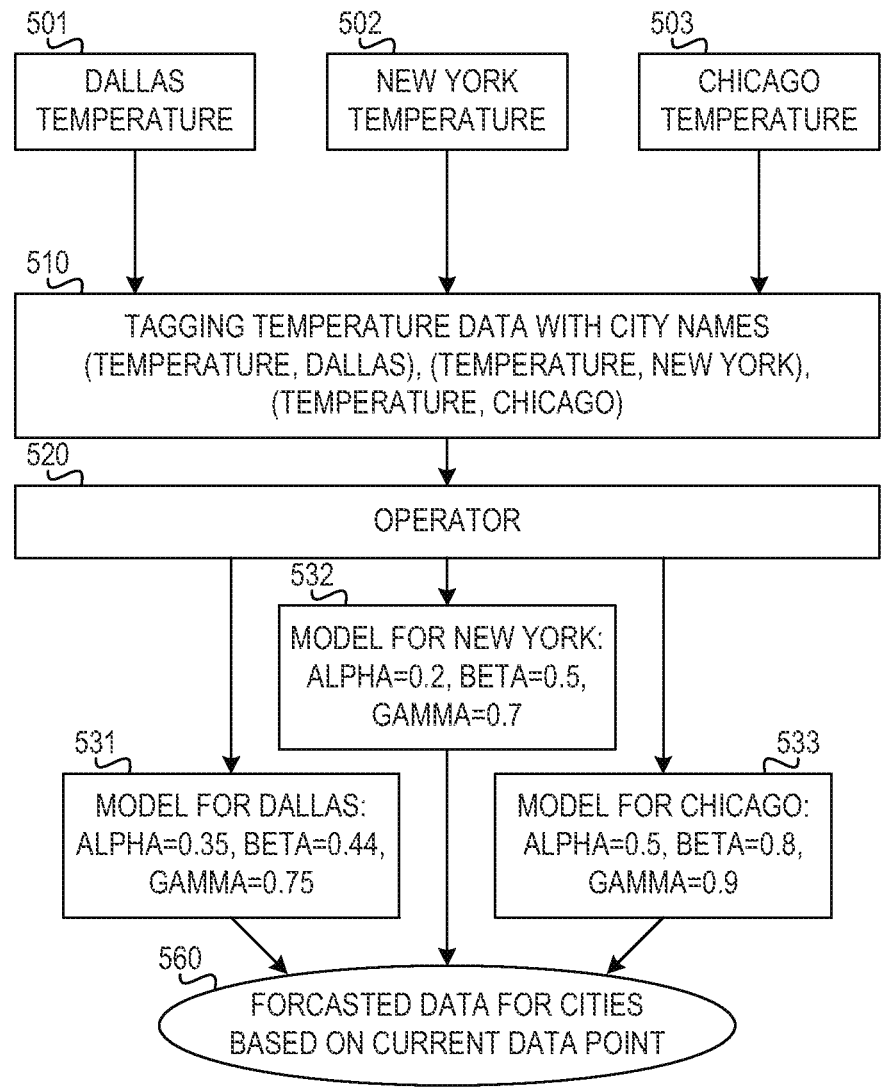

SYSTEM AND METHODOLOGY TO HANDLE MISDIRECTED INPUT DATA DURING MULTI PARTITIONED REAL TIME ANALYTICS

BACKGROUND

The present application relates generally to an improved data processing apparatus and method and more specifically to mechanisms for handling misdirected input data during multi-partitioned real-time analytics.

"Big Data" is an all-encompassing term for any collection of data sets so large and complex that it becomes difficult to process using traditional data processing applications. The challenges include analysis, capture, curation, search, sharing, storage, transfer, visualization, and privacy violations. The trend to larger data sets is due to the additional information derivable from analysis of a single large set of related data, as compared to separate smaller sets with the same total amount of data, allowing correlations to be found to spot business trends, prevent diseases, combat crime, and so on.

Information management (IM) is the collection and management of information from one or more sources and the distribution of that information to one or more audiences. This sometimes involves those who have a stake in, or a right to, that information. Management means the organization of and control over the planning, structure, processing, evaluating, and reporting of information activities in order to meet client objectives and to enable corporate functions in the delivery of information.

SUMMARY

In one illustrative embodiment, a method, in a data processing system, is provided for data stream change detection and model swapping in a stream computing platform. The method comprises building a model for each input data stream in a stream computing, platform. Each tuple of each given input data stream is tagged with a key corresponding to the given input data stream. The method further comprises performing an operation on each input data stream using its corresponding model. The method further comprises detecting a misdirected input data stream, which is tagged with a key that does not correspond to the misdirected input data stream. The method further comprises pausing the misdirected input data stream and swapping a model corresponding to the misdirected input data stream with another model corresponding to another paused input data stream.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B are block diagrams illustrating an example stream computing platform for temperature forecasting in accordance with an illustrative embodiment;

FIGS. 7A and 7B illustrate hash table listing partitions with status and model parameters in accordance with an illustrative embodiment.

DETAILED DESCRIPTION

Figure 1:
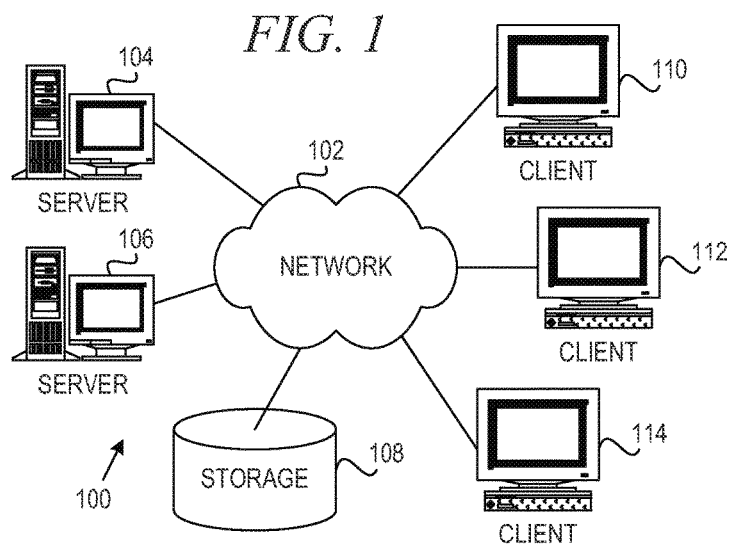
FIG. 1 is an example diagram of a distributed data processing system in which aspects of the illustrative embodiments may be implemented.

Information management (IM) systems include advanced analytic platforms that allow user-developed applications to quickly ingest, analyze, and correlate information as it arrives from thousands of real-time sources. Such a solution can handle very high data throughput rates, up to millions of events or messages per second. In traditional processing, queries are typically run against relatively static sources of data to provide a query result set for analysis. With stream computing, a process or operator can be thought of as a continuous query, and the results are continuously updated as the data sources are refreshed. Traditional queries seek and access static data, but with stream computing, a continuous stream of data flows to the application and is continuously evaluated by static queries.

Stream computing platforms support various toolkits that accelerate application development. One such toolkit is a time series toolkit that supports modeling and forecasting operators, which create an internal model at runtime to analyze data.

A time series is a sequence of data points, measured typically at successive points in time spaced at uniform time intervals. Examples of time series are the daily closing value of the Dow Jones Industrial Average and the annual flow volume of the Nile River at Grand Ethiopian Renaissance Dam. Time series are very frequently plotted via line charts. Time series are used in statistics, signal processing, pattern recognition, econometrics, mathematical finance, weather forecasting, earthquake prediction, electroencephalography, control engineering, astronomy, communications engineering, and largely in any domain of applied science and engineering which involves temporal measurements.

Time series analysis comprises methods for analyzing time series data in order to extract meaningful statistics and other characteristics of the data. Time series forecasting is the use of a model to predict future values based on previously observed values. While regression analysis is often employed in such a way as to test theories that the current values of one or more independent time series affect the current value of another time series, this type of analysis of time series is not called "time series analysis," which focuses on comparing values of a single time series or multiple dependent time series at different points in time.

Time series data have a natural temporal ordering. This makes time series analysis distinct from cross-sectional studies, in which there is no natural ordering of the observations. Time series analysis is also distinct from spatial data analysis where the observations typically relate to geographical locations. A stochastic model for a time series will generally reflect the fact that observations close together in time will be more closely related than observations further apart. In addition, time series models will often make use of the natural one-way ordering of time so that values for a given period will be expressed as deriving in some way from past values, rather than from future values.

Time series forecasting models include ARIMA and Holtwinter, for example. ARIMA models are, in theory, the most general class of models for forecasting a time series which can be made to be "stationary" by differencing (if necessary), perhaps in conjunction with nonlinear transformations such as logging or deflating (if necessary). A random variable that is a time series is stationary if its statistical properties are all constant over time. A stationary series has no trend, its variations around its mean have a constant amplitude, and it wiggles in a consistent fashion, i.e., its short-term random time patterns always look the same in a statistical sense. The latter condition means that its autocorrelations (correlations with its own prior deviations from the mean) remain constant over time, or equivalently, that its power spectrum remains constant over time. A random variable of this form can be viewed (as usual) as a combination of signal and noise, and the signal (if one is apparent) could be a pattern of fast or slow mean reversion, or sinusoidal oscillation, or rapid alternation in sign, and it could also have a seasonal component. An ARIMA model can be viewed as a "filter" that tries to separate the signal from the noise, and the signal is then extrapolated into the future to obtain forecasts.

Exponential smoothing is a technique that can be applied to time series data, either to produce smoothed data for presentation, or to make forecasts. The time series data themselves are a sequence of observations. The observed phenomenon may be an essentially random process, or it may be an orderly, but noisy, process. Whereas in the simple moving average the past observations are weighted equally, exponential smoothing assigns exponentially decreasing weights over time. Exponential smoothing is commonly applied to financial market and economic data, but it can be used with any discrete set of repeated measurements. The simplest form of exponential smoothing may be used for data without any systematic trend or seasonal components, Simple exponential smoothing does not do well when there is a trend in the data. In such situations, several methods have been devised under the name "double exponential smoothing" or "second-order exponential smoothing," The basic idea behind double exponential smoothing is to introduce a term to take into account the possibility of a series exhibiting some form of trend. This slope component is itself updated via exponential smoothing. An example of double exponential smoothing is the Holt-Winters forecasting model.

Stream computing platforms provide a plethora of adapters to ingest data into streaming application from various sources including databases, files, Web applications, or devices. In large scale, real-time deployments, it is typical to ingest data from several devices or sources into the stream computing application. The stream computing platform attaches a label to data coming from a particular source to identify the origin of data. This allows the operator to treat streaming data from each source as a separate entity. This concept is referred to as "partitioning," and each data stream from each source is referred to as a "partition." The stream computing platform applies operator logic on each partition independently of other partitions. Internally, the stream computing platform maintains a lookup table containing the name (tag) of each partition, which it then compares against the label of incoming data.

As an illustration, the stream computing platform may represent partitioned data as follows: 13.3, "S1"; 14.2, "S2"; 11.1, "S3"; and so on, each incoming tuple containing data (numeric value) and the label (string value); the label indicates the source of the data. The operator treats the data with "S1" and "S2" as separate entities. When large-dimensional data are handled, it is possible for data at the source or at the stream computing application level to be misdirected or incorrectly tagged. The illustrative embodiments provide mechanisms for handling misdirected input data during multi-partitioned real-time analytics.

Before beginning the discussion of the various aspects of the illustrative embodiments, it should first be appreciated that throughout this description the term "mechanism" will be used to refer to elements of the present invention that perform various operations, functions, and the like, A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism," Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
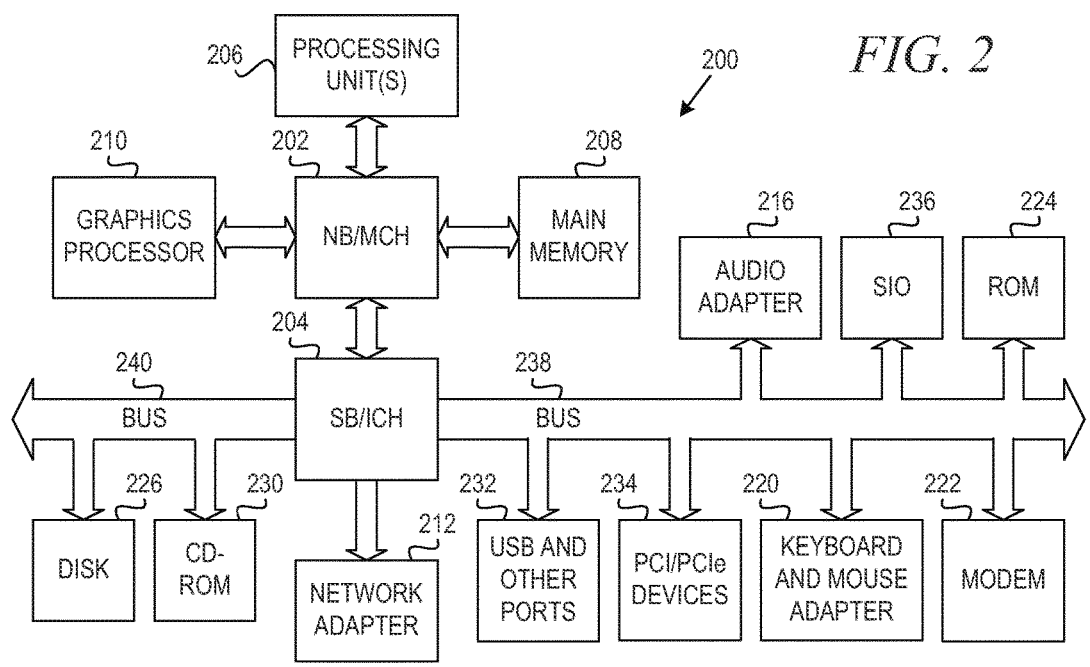
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected NB/MCH 202 through accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not, ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture, A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2, Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
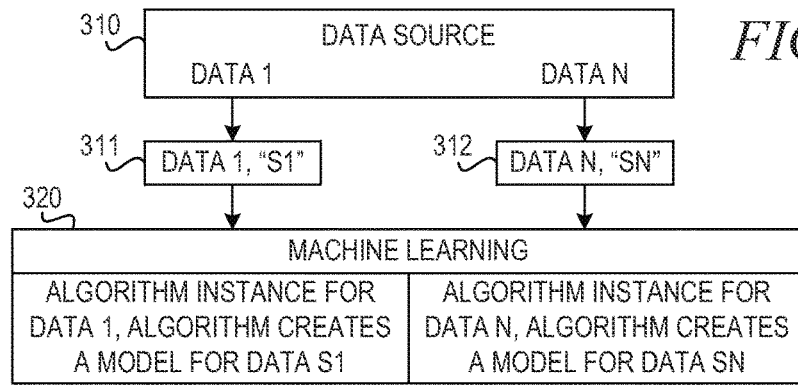
FIGS. 3A and 3B are block diagrams depicting a stream computing platform in accordance with an illustrative embodiment.
Figure 3B:
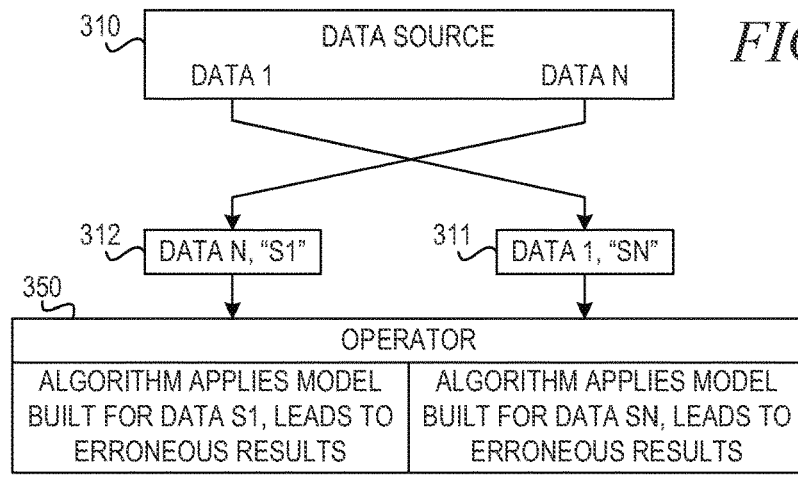

FIGS. 3A and 3B are block diagrams depicting a stream computing platform in accordance with an illustrative embodiment. More particularly, with reference to FIG. 3A, data source 310 generates a plurality of streams: data 1 311 ... data N 312. Machine learning component 320 performs an algorithm instance for each data stream (partition) that creates a model for each data stream.

In the example shown in FIG. 3A, data 1 311 is tagged with tag "S1" and data N 312 is tagged with the key "SN." Machine learning component 320 performs an algorithm instance for data 1 311, tagged with the key "S1," and creates a model for data tagged with the key "S1," In one illustrative embodiment, machine learning component 320 consumes the first N samples for model creation. In an example embodiment, the value of N is specified by a user. The value of N may be any integer value, such as 100, 125, 1000, etc. Machine learning component 320 performs an algorithm instance for data N 312, tagged with the key "SN," and creates a model for data tagged with the key "SN." For subsequent data received in the stream of data 1 311, operator 320 may then apply the model created for data tagged with the key "S1" to perform some function, such as data forecasting for example. Similarly, for subsequent data, i.e., data tuples received post model building, received in the stream of data N 312, machine learning component 320 may then apply the model created for data tagged with the key "SN."

In one example embodiment, the model may be built using machine learning techniques, such as logistic regression. Machine learning component 320 may determine a function, $\theta 1 \ldots \eta N$ that describes the features that fit the input data. Machine learning component 320 can estimate parameters for this function from features from the training data 311, 312. During training, as the machine learning component 320 encounters data that is known to be from a predetermined data source 310, machine learning component 320 refines function $\theta 1 \ldots \theta N$ such that the parameters of this function map features of the data stream 311, 312.

Each function $\theta 1 \ldots \theta N$ can be designed from a logistic regression model. Logistic regression produces a score between 0 and 1 according to the following formula:

$$f(x) = \frac{1}{1 + e^{-\beta_0 - \Sigma_{m=1}^{M} \beta_m x_m}},$$

where m ranges over the M features for instance x and $\beta_0$ is the "intercept" or "bias" term.

An instance x is a vector of numerical feature values, corresponding to one single occurrence of whatever the logistic regression is intended to classify. Output f(x) is used like a probability, and learned parameters $\beta_m$ are interpreted as "weights" gauging the contribution of each feature. For example, a logistic regression to classify weather data for a particular city would have one instance per time period, and each instance would list numerical features such as date, time of day, temperature, amount of precipitation, barometric pressure, etc. The training data consist of many such instances along with labels indicating the correct f(x) value for each (e.g., 1 for Dallas and 0 for not Dallas). The learning system computes the model (the β vector) that provides the best fit between f(x) and the labels in the training data. That model, shown as θ above, is then used on test data to classify instances.

In the illustrative embodiment, instances correspond to data instances in a data stream, and the numerical values for the instance vector are features found in the input data. Labels on the training data encode whether the input data are from a particular source. Thus, machine learning component 320 learns the values for the β vector that best distinguish the data source for the training data. That is, the model uses the corresponding labels from the training data to obtain the function for each city. Those β values may then be used on subsequent data streams to perform an operation on the input data stream based on the model for the data stream.

The dimensions on the data may be as high as 10,000 or more. When such large-dimensional data are handled, it is possible that the data at the source 310 (from the field) or at the stream computing platform application level, the data from one data stream may be misdirected and fall into the data stream of another partition and get tagged incorrectly. Consider applications such as world climate monitoring, electricity consumption prediction, or oceanography where thousands of sensors are connected over satellite or wireless links. Tags used to denote devices may get interchanged due to human errors or interchanging of uplink ports during maintenance.

At the stream computing application level, it is possible that if the tags are parameterized using a lookup table or external source, a logical error in the code may lead to incorrect tagging. The opportunities for misdirected input increase for a Big Data environment, which deals with high dimensional data in real time.

FIG. 3B depicts a stream computing platform with misdirected data streams in accordance with the illustrative embodiment. In the depicted example, data 1 311 is incorrectly tagged with the key "SN," and data N 312 is incorrectly tagged with the key "S1." In this case, operator 350 applies the model created for the data stream tagged with "S1" to data N 312 and applies the model created for the data stream tagged with "SN" to data 1 311. As a result, results of operator 350 may be erroneous for data 1 311 and data N 312. The data streams may include additional data streams that are correctly tagged, Only data streams that are incorrectly tagged will have erroneous results due to mislabeling.

Hence, when data are misdirected and tagged to a different key during runtime, the operator processing the data for a particular source will use a model that was built with data from a different source. This leads to erroneous results. The misdirected data and erroneous results may even go undetected. The illustrative embodiments attempt to limit the scope of the problem and the solution to analytics and in particular to time series data. The illustrative embodiments assume that the model training completes with the correct data and that source mislabeling occurs during data processing activity after model building.

Solutions to detect erroneous model tagging are scant. Existing solutions only detect a change or drift in input data, but there is no automated way to handle the misdirected input data situation or to transform drift detection into a correction mechanism for mislabeled models.

The illustrative embodiments provide a mechanism that uses change detection logic on all input links to identify input swapping. Accordingly, the mechanism performs model swapping in order to correct a mislabeled model and partition without system interruption. In accordance with the illustrative embodiments, the mechanism detects the change in the input data and swaps the models in the operator to find the right model for incoming data.

Figure 4:
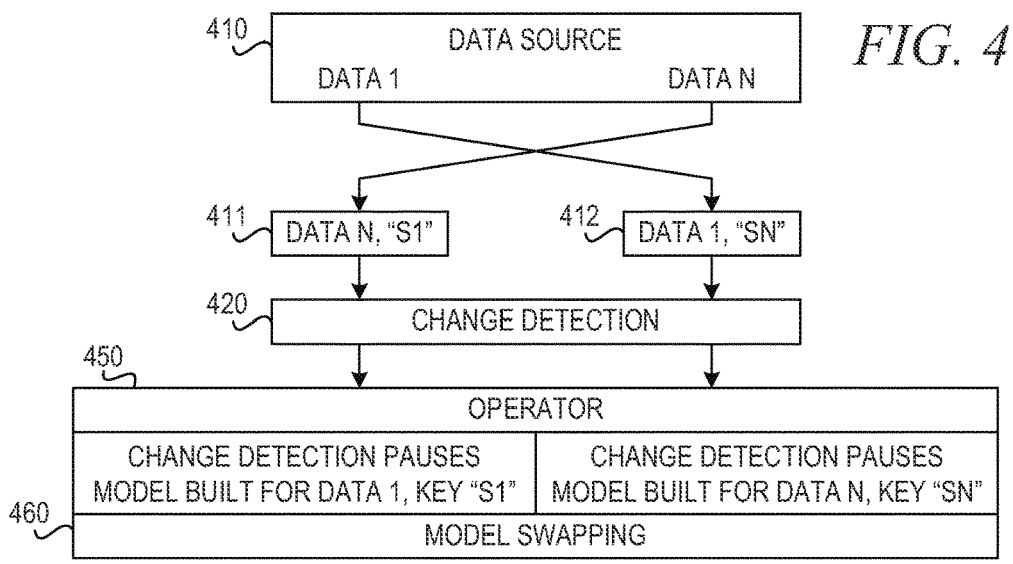
FIG. 4 is a block diagram depicting a stream computing platform with model swapping in accordance with an illustrative embodiment.

FIG. 4 is a block diagram depicting a stream computing platform with model swapping in accordance with an illustrative embodiment. Data source 410 generates a plurality of streams: data 1 . . . data N. The illustrative embodiment assumes that all model training has been completed and that model swapping occurs after all models have trained and are used on incoming data. In the depicted example, data 1 412 is incorrectly tagged with the key "SN," and data N 411 is incorrectly tagged with the key "S1." In this case, operator 450 applies the model created for the data stream tagged with "S1" to data N 411 and applies the model created for the data stream tagged with "SN" to data 1 412. As a result, results of operator 450 may be erroneous for data 1 411 and data N 412. The data streams may include additional data streams that are correctly tagged. Only data streams that are incorrectly tagged will have erroneous results due to mislabeling.

Change detection component 420 detects a change of data in input streams 411, 412. In one example embodiment, change detection component 420 uses a machine learning algorithm, such as that described above with respect to machine learning component 320 in FIG. 3A, to build a model for each data stream. Change detection component 420 may then apply a corresponding model to input data for each given data stream 411, 412. Change detection component 420 may detect a change in a given data stream in response to an indication that the input data does not fit the corresponding model.

In an alternative embodiment, change detection component 420 comprises customized logic that uses mean squared errors at the output of the models for change detection. The mean squared error (MSE) measures the average of the squares of the "errors," that is, the difference between the estimator and what is estimated. In one example embodiment, change detection component 420 uses root mean squared error (RMSE) for change detection.

In response to detecting a misdirected data stream, change detection component 420 pauses the model built for the misdirected data stream in operator 450. In the depicted example, change detection component will detect that data streams 411, 412 are misdirected and pause the model built for data tagged with key "S1" and the model built for data tagged with key "SN." Detection of change in input time series in at least two data sources indicates a high probability of data being swapped, Therefore, when a change is detected in at least two data sources at the same timestamp, operator 450 initiates model swapping 460. However, if change is detected in only one data source, then operator 450 does not initiate model swapping 460.

When an incorrect input data stream is detected, the change detection component 420 pauses the processing of the current partition (data stream), preventing any further incorrect tuples being forwarded downstream. Model swapping component 460 maintains a synchronized hash table that lists the current paused partitions and their corresponding model's parameters. For each paused partition, model swapping component 460 accesses the models of the other paused partitions in a sequential manner. Model swapping component 460 verifies each accessed model for the data in the partition and considers the model that fits the data by least error or any other measure to be the best fit model. Model swapping component 460 accesses and verifies the other models in a synchronized manner to prevent error during model sharing. When model swapping component 460 identifies a best fit model for a partition, model swapping component 460 deletes the entry for the partition from the hash partition table and replaces the best fit model for the previously used model.

FIGS. 5A and 5B are block diagrams illustrating an example stream computing platform for temperature forecasting in accordance with an illustrative embodiment. More particularly, with reference to FIG. 5A, the stream computing platform receives input data for various cities, including Dallas temperature 501, New York temperature 502, and Chicago temperature 503. In block 510, the stream computing platform tags temperature data with city names resulting in (temperature, Dallas), (temperature, New York), and (temperature, Chicago).

In the example depicted in FIG. 5A, operator 520 builds a model for each data source based on training data. In one example embodiment, operator 520 builds a time series forecasting model as described above.

In block 530, the initial training size is 150 streaming data points, and operator 520 builds a model for Dallas 531 consisting of the following coefficients: alpha=0.35, beta=0.44, gamma=0.75. Operator 520 builds a model for New York 532 consisting of the following coefficients: alpha=0.2, beta=0.5, gamma=0.7. Operator 520 builds a model for Chicago 533 consisting of the following coefficients: alpha=0.5, beta=0.8, gamma=0.9. Thus, operator 520 generates coefficients 550 calculated for each model using the initial training data points, which for the models for the source input streams.

Turning to FIG. 5B, operator 520 performs forecasting using the model built for every data point. That is, using models 531, 532, 533, operator 520 generates forecasted data 560 for the cities based on a given data point.

Figure 6:
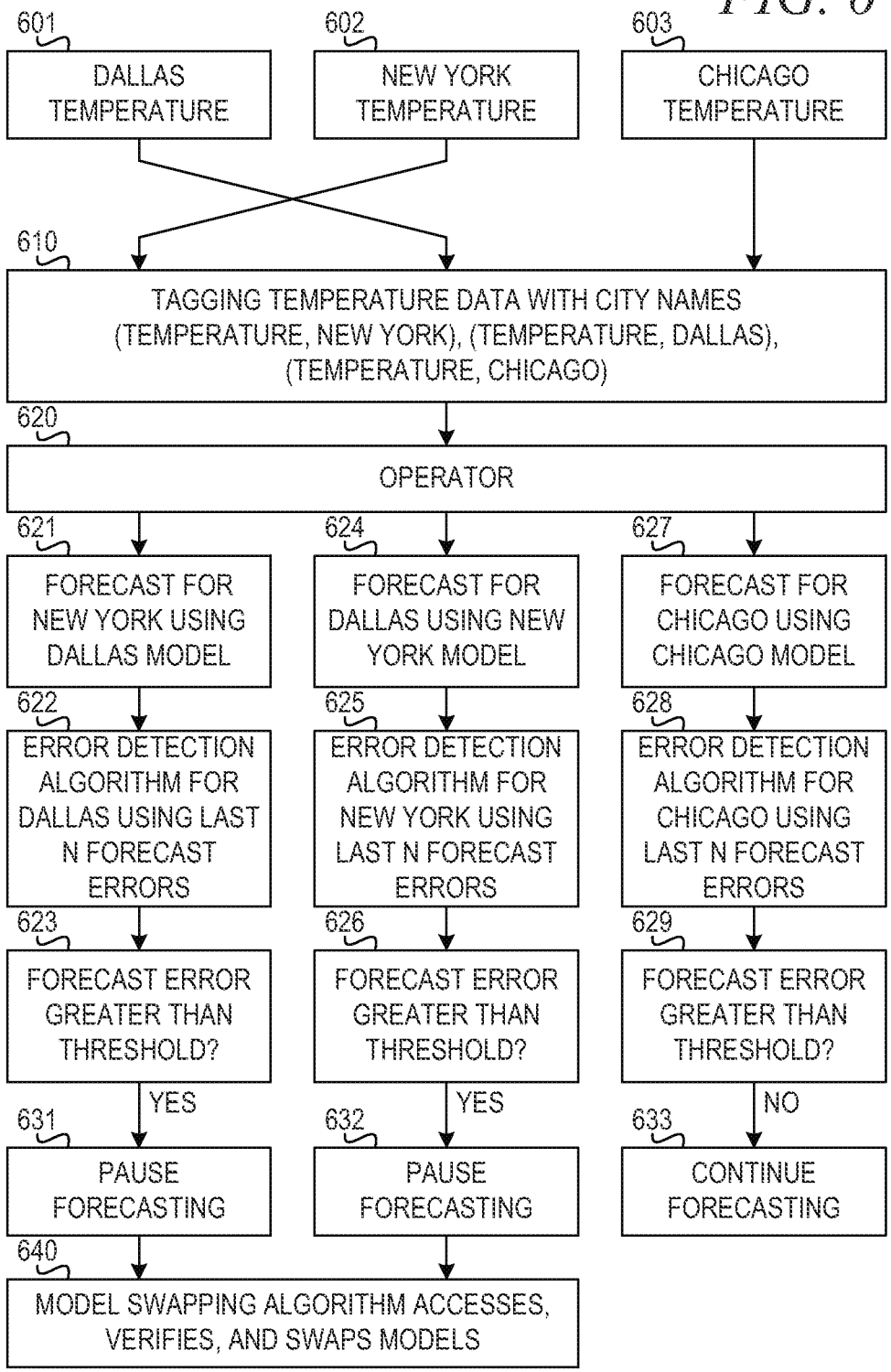
FIG. 6 is a block diagram illustrating an example stream computing platform for temperature forecasting with change detection and model swapping in accordance with an illustrative embodiment.

FIG. 6 is a block diagram illustrating an example stream computing platform for temperature forecasting with change detection and model swapping in accordance with an illustrative embodiment. The stream computing platform receives input data for various cities, including Dallas temperature 601, New York temperature 602, and Chicago temperature 603. In block 610, the stream computing platform tags temperature data with city names resulting in (temperature, Dallas), (temperature, New York), and (temperature, Chicago).

In block 621, operator 620 performs forecasting resulting in a forecast for tuples from the New York temperature source 602, incorrectly tagged with the key "Dallas," using the Dallas model (e.g., model 531 in FIGS. 5A and 5B). In block 622, a change detection component executes an error detection algorithm for Dallas using the last N forecast errors, where N is a predetermined constant. The value of N may be set by a user where a lower value results in more sensitive change detection, while a higher value results in more reliable overall change detection. In block 623, the change detection component determines whether forecast error is greater than a predetermined threshold.

In block 624, operator 620 performs forecasting resulting in a forecast for tuples from the Dallas temperature source 601, incorrectly tagged with the key "New York," using the New York model (e.g., model 532 in FIGS. 5A and 5B). In block 625, a change detection component executes an error detection algorithm for New York using the last N forecast errors, where N is a predetermined constant. The value of N may be set by a user where a lower value results in more sensitive change detection, while a higher value results in more reliable overall change detection. In block 626, the change detection component determines whether the forecast error is greater than a predetermined threshold.

In block. 627, operator 620 performs forecasting resulting in a forecast for Chicago using the Chicago model (e.g., model 533 in FIGS. 5A and 5B). In block. 628, a change detection component executes an error detection algorithm for Chicago using the last N forecast errors, where N is a predetermined constant. The value of N may be set by a user where a lower value results in more sensitive change detection, while a higher value results in more reliable overall change detection. In block 629, the change detection component determines whether the forecast error is greater than a predetermined threshold.

In the depicted example, the forecast error for the Dallas model is greater than the threshold in block 623, and, in response, the change detection component pauses forecasting in block 631. Similarly, the forecast error for the New York model is greater than the threshold in block 626, and, in response, the change detection component pauses forecasting in block 632. Also, the forecast error for the Chicago model is less than the threshold in block 629, and, in response, the change detection component continues forecasting in block 633.

In an alternative embodiment, change detection algorithms based on machine learning may be used before operator 620 to detect a change in the input time series characteristics. In operator 620, the model may be paused based on the results of the change detection.

Once the model is paused, in block 640, a model swapping algorithm accesses the models of other paused partitions. In the depicted example, the model swapping algorithm accesses the New York model for the Dallas data stream and accesses the Dallas model for the New York data stream, because for the Dallas data stream, the New York model is the only other paused model and vice versa. If more than two partitions are paused, the model swapping algorithm accesses the other models sequentially.

In block 640, the model swapping algorithm verifies whether the accessed model is a best fit for the data stream. In one example embodiment, the model swapping algorithm verifies a model using root mean squared error (RMSE). That is, the model with the least RMSE is considered to be the best fit model. In the depicted example, the New York model is the best fit for the mislabeled Dallas temperature data stream 601, and the Dallas model is the best fit for the mislabeled New York temperature data stream 602. Therefore, in block 640, the model swapping algorithm swaps the Dallas model and the New York model.

On the other hand, in the depicted example, the forecast error is not greater than the threshold in block 629. Therefore, operator 620 continues forecasting for the Chicago temperature data stream 603.

FIGS. 7A and 7B illustrate hash table listing partitions with status and model parameters in accordance with an illustrative embodiment. As shown in FIG. 7A, the Dallas and New York partitions are paused due to detecting changes in the input data streams, while the Washington D.C. and Chicago partitions continue running. The model parameters for the Dallas partition are as follows: alpha=0.3, beta=0.3, gamma=0.5. The model parameters for the New York partition are as follows: alpha=0.5, beta=0.4, gamma=0.9.

Turning to FIG. 7B, the model swapping mechanism of the illustrative embodiments swaps the Dallas and New York models resulting in both models being the best fits for their respective partitions. The operator may then continue running the partitions, thus correcting misdirected input data streams on the fly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium Or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or Hock diagram block or blocks.

Figure 8:
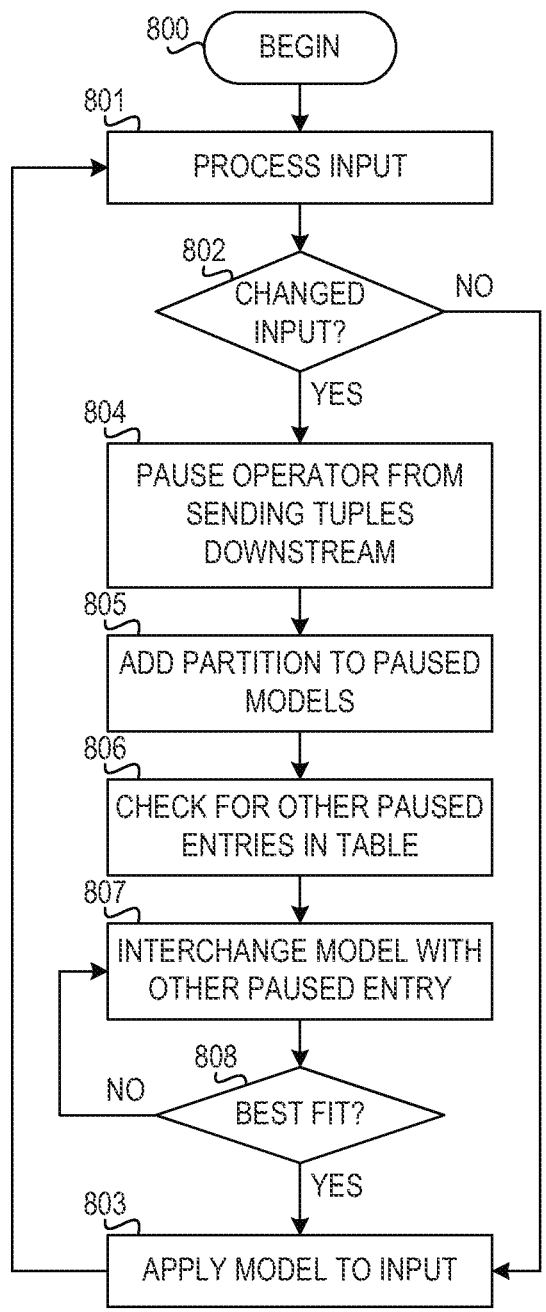
FIG. 8 is a flowchart illustrating operation of a mechanism for data stream change detection and model swapping in a stream computing platform in accordance with an illustrative embodiment.

FIG. 8 is a flowchart illustrating operation of a mechanism for data stream change detection and model swapping in a stream computing platform in accordance with an illustrative embodiment. Operation begins (block 800), and the mechanism processes an input data stream (block 801). The mechanism detects whether a changed input is detected (block 802). As described above, the mechanism may detect a changed input using a machine learning algorithm to detect whether input data does not fit a trained model. Alternatively, the mechanism may detect a changed input using customized logic that uses mean squared errors at the output of the models.

If the mechanism does not detect a changed input in block 802, the mechanism applies the current model corresponding to the input data stream to the input data (block 803). Thereafter, operation returns to block 801 to process the next input.

If the mechanism detects a changed input in block 802, the mechanism pauses the operator from sending tuples (results) downstream (block 804). Then, the mechanism adds the partition to a table of paused models (block 805). The mechanism checks for other paused entries in the table (block 806). If there are no other paused entries (not shown), then operation returns to block 801. However, if there are at least two paused partitions in the table in block 806, the mechanism interchanges the model with the model of another paused entry (block 807).

The mechanism then determines whether the currently accessed model is the best fit for the input data stream (block 808). As discussed above, the mechanism may determine a best fit using a machine learning model or, alternatively, determining whether the model with the least mean squared error, for example. If the currently accessed model is not the best fit, then operation returns to block 807 to interchange the model with the next paused model. If the currently accessed model is the best fit in block 808, then the mechanism applies the currently accessed model to the input data stream (block 803). Thereafter, operation returns to block 801 to process the next input.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for data stream change detection and model swapping in a stream computing platform. The mechanisms provide reliability to real-time analytical solutions in a transparent manner. The mechanisms automate the process of swapping models for misdirected input data streams by identifying a best fit model. The mechanisms prevent errors from trickling down to downstream operators in stream computing applications and relieve users from manual debugging processes.

The mechanisms also prevent false alarms due to data swapping and reduce application down time.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a stream computing platform for data stream change detection and model swapping, the method comprising:

building, by a machine learning component executing within the stream computing platform, a model for each input data stream in the stream computing platform, wherein each tuple of each given input data stream is tagged with a key corresponding to the given input data stream;

performing, by an operator component executing within the stream computing platform, an operation on each input data stream using its corresponding model;

detecting, by a change detection component executing within the stream computing platform, a misdirected input data stream, wherein the misdirected input data stream is tagged with a key that does not correspond to the misdirected input data stream;

pausing, by the change detection component, the misdirected input data stream; and swapping, by a model swapping component executing within the stream computing platform, a model corresponding to the misdirected input data stream with another model corresponding to another paused input data stream.

2. The method of claim 1, wherein building the model for each input data stream comprises performing machine learning on a predetermined number of initial input tuples to form a machine learning model.

3. The method of claim 2, wherein the machine learning model is a time series forecasting model.

4. The method of claim 3, wherein the time series forecasting model is an ARIMA model or a Holt-Winters model.

5. The method of claim 1, wherein performing an operation on each input data stream comprises performing a time series forecasting operation on each input data stream using its corresponding model.

6. The method of claim 1, wherein detecting the misdirected input data stream comprises:

performing error detection on a result of the operation for a given input data stream; and responsive to determining that a number of errors in the results of the operation for the given input data stream exceeds a threshold, determining that the given input data stream is misdirected.

7. The method of claim 1, wherein detecting the misdirected input data stream comprises:

responsive to determining the input data stream does not fit its corresponding model, determining that the given input data stream is misdirected.

8. The method of claim 1, further comprising:

responsive to pausing the misdirected input data stream, entering the misdirected input data stream in a hash table that lists current paused data streams and their corresponding model parameters.

9. The method of claim 8, wherein swapping the model corresponding to the misdirected input data stream with another model corresponding to another paused input data stream comprises:

swapping the model corresponding to the misdirected input data stream with each other model corresponding to a paused input data stream in the hash table;

determining which other model is a best fit for the misdirected input data stream; and swapping the model corresponding to the misdirected input data stream with the other model that is the best fit for the misdirected input data stream.

* * * * *